United States Patent [19]

Wu

[11] Patent Number: 6,144,514
[45] Date of Patent: Nov. 7, 2000

[54] FORMAT CALCULATOR FOR HEADERLESS HARD DISK WITH EMBEDDED SERVO WEDGES

[75] Inventor: Joanne C. Wu, Diamond Bar, Calif.

[73] Assignee: Adaptec, Inc., Milpitas, Calif.

[21] Appl. No.: 09/177,670

[22] Filed: Oct. 22, 1998

Related U.S. Application Data

[62] Division of application No. 08/808,099, Feb. 28, 1997, Pat. No. 5,959,795.

[51] Int. Cl.$^7$ ....................................................... G11B 5/09
[52] U.S. Cl. ............................................................... 360/51
[58] Field of Search ......................................... 360/51, 48

[56] References Cited

U.S. PATENT DOCUMENTS 5,627,946  5/1997  Strang, Jr. ............................ 360/77.08

Primary Examiner—W. Chris Kim
Attorney, Agent, or Firm—Skjerven Morrill MacPherson LLP; David T. Millers

[57] ABSTRACT

A disk sequencer in a headerless disk drive system includes a format calculator that performs arithmetic processing on a frame number to generate frame parameters that indicate the format of a data frame associated with the frame number. The disk sequencer then uses the frame parameters to identify boundaries of data segments during a read or write. Arguments of the arithmetic processing include the frame number, static parameters that indicate fixed field sizes, and zone parameters that depend on the track. The static and zone parameters can be transferred to the disk sequencer during initialization and a seek respectively. The arithmetic processing is completed during processing of a servo sector to permit zero latency accesses. In one embodiment, the zone parameters are less than two words per zone and include a byte count for an ending partial data sector and a number of full data sectors in a first frame. Thus, a small amount memory and bandwidth is required for storage and transmission of zone parameters. The frame parameters generated include a byte count for a beginning partial data sector, a number of full data sectors in the frame, and a byte count for an ending partial data sector.

14 Claims, 8 Drawing Sheets

FORMAT CALCULATOR FOR HEADERLESS HARD DISK WITH EMBEDDED SERVO WEDGES

CROSS-REFERENCE TO RELATED APPLICATION

This is a divisional application Ser. No. 08/808,099, filed Feb. 28, 1997, U.S. Pat. No. 5,959,795.

BACKGROUND

1. Field of the Invention

This invention relates to disk drives and disk control circuits that identify the boundaries of headerless data sectors.

2. Description of Related Art

A conventional magnetic media for a hard drive is a disk having major surfaces divided into concentric tracks for data storage. Servo wedges, which are spaced about the disk in a spoke-like pattern, subdivide the tracks into data frames. The portion of a servo wedge within a track is referred to as a servo sector and separates one data frame in the track from another. Typically, a servo sequencer uses the servo sectors in a track to keep a data head following the track and generates end-of-servo (EOS) pulses marking the ends of servo sectors and the beginnings of data frames. In addition to track following information, a servo sector often contains an ID field identifying the servo sector and an associated data frame.

Data in data frames is typically organized into data sectors, each of which contains the same amount of data, for example, 512 bytes. The data sectors may include a single data segment that is entirely within a data frame or multiple data segments that are separated from each other, for example, by a servo sector. For constant density recording, the disk area per data byte is constant, but the amount of data that fits within a data frame varies because the available area depends on the circumferences of the track containing the data frame. Accordingly, the locations of boundaries (i.e. the starts and splits) of data sectors depend on the track.

When reading or writing a data sector, the boundaries of each data segment need to be identified. One method for identifying data sector boundaries uses information from a header of a data sector to locate splits in the data sector. However, split information stored in headers wastes disk space that could otherwise store data.

A headerless data sectors lacks headers containing split information which leaves more disk area for data storage. However, a disk sequencer still requires split information to locate the boundaries of data sectors and segments. A hard disk can store such split information in non-volatile memory, on disk in data sectors, or in a data buffer memory. The split information typically takes the form of look-up tables that describe track formats. For example, a hard disk would typically require one look-up table per zone of tracks having a common track format. Each table contains format words associated with particular data frames, data sectors, or data segments. If, for example, a hard disk having 20 different zones of tracks and 64 embedded servo wedges requires an average of three words of split information per data frame, the hard disk requires twenty look-up tables and a total of 3840 words of split information.

To avoid degrading performance, a hard disk commonly requires additional data buffer capacity, bandwidth, and processing power for handling the split information. If the required bandwidth is not available when required to transfer split information to a disk sequencer, the hard disk may miss a data sector and delay a transfer for a revolution of the disks. Additionally, firmware executed by a microprocessor in the disk drive must identify the table and split information that corresponds to the current position of the data heads relative to a track being followed. The calculations required to identify the split information can be complex and consume processing power that could otherwise be used for other purposes such as controlling a servo sequencer, managing a data buffer, handling a host interface, and converting read/write requests to a list of physical data sector to be accessed. Processes and/or circuits are sought that reduce the amount of split information and reduce the processing demands on a microprocessor in a hard drive.

SUMMARY

In accordance with the invention, arithmetic processing of a frame number generates frame parameters that indicate the format of a data frame associated with the frame number. A disk sequencer uses the arithmetically derived frame parameters to identify boundaries of data segments during a read or a write. Arguments for the arithmetic processing include the frame number, static parameters that indicate fixed field sizes, and zone parameters that depend on the track. In one embodiment, the zone parameters are less than two words per zone and include a byte count for an ending partial data sector in a first frame and a number of full data sectors in the first frame. Thus, only a small amount memory is required to store the necessary split information. The frame parameters generated for a frame include a byte count for a beginning partial data sector in the frame, a number of full data sectors in the frame, and a byte count for an ending partial data sector of the frame.

In an exemplary embodiment, the disk sequencer includes a format calculator that performs arithmetic processing. The static parameters for the format calculator are transferred to the disk sequencer during initialization, and thus do not compete for data transmission bandwidth. The zone parameters are transferred to the disk sequencer during a seek. The arithmetic processing may includes preliminary calculations during the seek and frame parameter calculations during servo sector handling. The preliminary calculations, for example, determine additional zone parameters such as a repeat count indicating separation on a track between data frames having the same format. The frame parameter calculations are completed during processing of a servo sector to permit zero latency accesses.

DETAILED DESCRIPTION OF THE PREFERRED EMBODIMENTS

Figure 1:
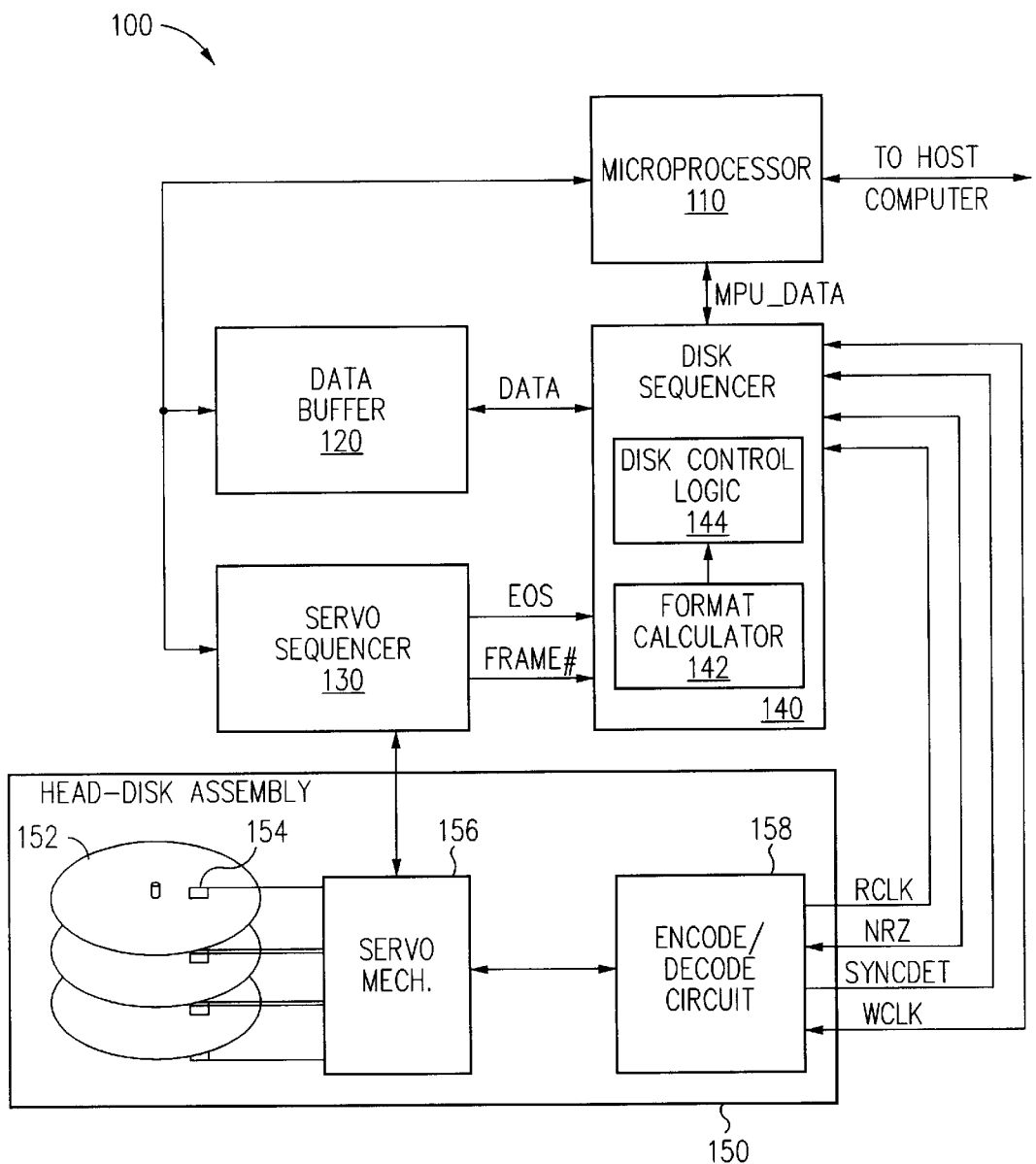
FIG. 1 is a block diagram of a hard disk in accordance with an embodiment of the invention.

In accordance with an embodiment of the invention shown in FIG. 1, a disk sequencer 140 contains a format calculator 142 that given a frame number calculates frame parameters indicating the format of a data frame. The data frame number can be identified from servo wedges on the disks. In addition to the frame number, format calculator 142 uses static parameters written to disk sequencer 140 during system initialization and zone parameters written to disk sequencer 140 during a seek to a zone. In an exemplary embodiment, only two words of zone parameters are required per zone. Accordingly, transfer of format information between a data buffer 120 or a system microprocessor 110 and disk sequencer 140 uses very little bandwidth. Additionally, the format calculation for a data frame is fast enough that the format calculation is completed during servo sector handling so that frame parameters are available when required at the next end-of-servo (EOS) pulse.

In FIG. 1, disk sequencer 140 is incorporated in a disk system 100 having a headerless architecture and embedded servo sectors. Disk system 100 includes microprocessor 110 that executes firmware to control disk sequencer 140, a servo sequencer 130, and an interface with a host computer (not shown). Disk sequencer 140 controls data transfer between data buffer 120 and a head-disk assembly (HDA) 150.

HDA 150 contains magnetic media (disks) 152 formatted for headerless data sectors, a servo mechanism 156 that radially positions data heads 154 relative to disks 152, and an encode/decode circuit 158. Encode/decode circuit 158 converts a data signal NRZ and a write clock signal WCLK from disk sequencer 140 to write signals for data heads 154 and converts signals generated by data heads 154 to data signal NRZ and a read clock RCLK to disk sequencer 140. In embodiment of FIG. 1, encode/decode circuit 158 also generates a signal SYNCDET from data sync fields that data heads 154 encounter on disks 152, and disk sequencer 140 synchronizes read operations to signal SYNCDET. In an alternative embodiment of the invention, disk sequencer 140 synchronizes data according pulses in signal NRZ that represent the data sync fields, and signal SYNCDET is not required. A clock signal BYTECLK has a frequency that matches the data transfer rate to or from disks 152 and varies with track radius as required for constant density recording. In particular, the frequency of clock signal BYTECLK is higher for tracks with larger radii.

Servo sequencer 130 is coupled to servo mechanism 156 and controls seek operations, track following, and servo sector handling. Such servo sequencers are well known in the art. Servo sectors contain identification fields indicating track and frame numbers associated with the servo sector and magnetization patterns that servo sequencer 130 uses for track following. While processing a servo sector, servo sequencer 130 reads an identification field to determine a frame number that identifies the servo sector and the following data frame. In the embodiment of FIG. 1, servo sequencer 130 asserts to disk sequencer 140 a signal FRAME# indicating the frame number. Alternatively, microprocessor 110 can write the frame number from servo sequencer 130 to disk sequencer 140. In still another alternative embodiment, disk sequencer 140 maintains an EOS count indicating the data frame number. The EOS count is initialized at an index pulse from servo sequencer 130 and incremented at each EOS pulse.

From the frame number, format calculator 142 determines frame parameters that indicated the locations of sector starts and splits in the following frame. For embodiments where format calculator 142 receives the frame number during handling of a servo sector, format calculator 142 calculates the frame parameters before the EOS pulse marking the start of a data frame. For the embodiment where format calculator 142 uses an EOS count that is incremented at EOS pulses, format calculator 142 can calculate the frame parameters for the next frame based on the EOS count for the previous frame so that the frame parameters are available before the EOS pulse marking the start of the next data frame.

Figure 2A:
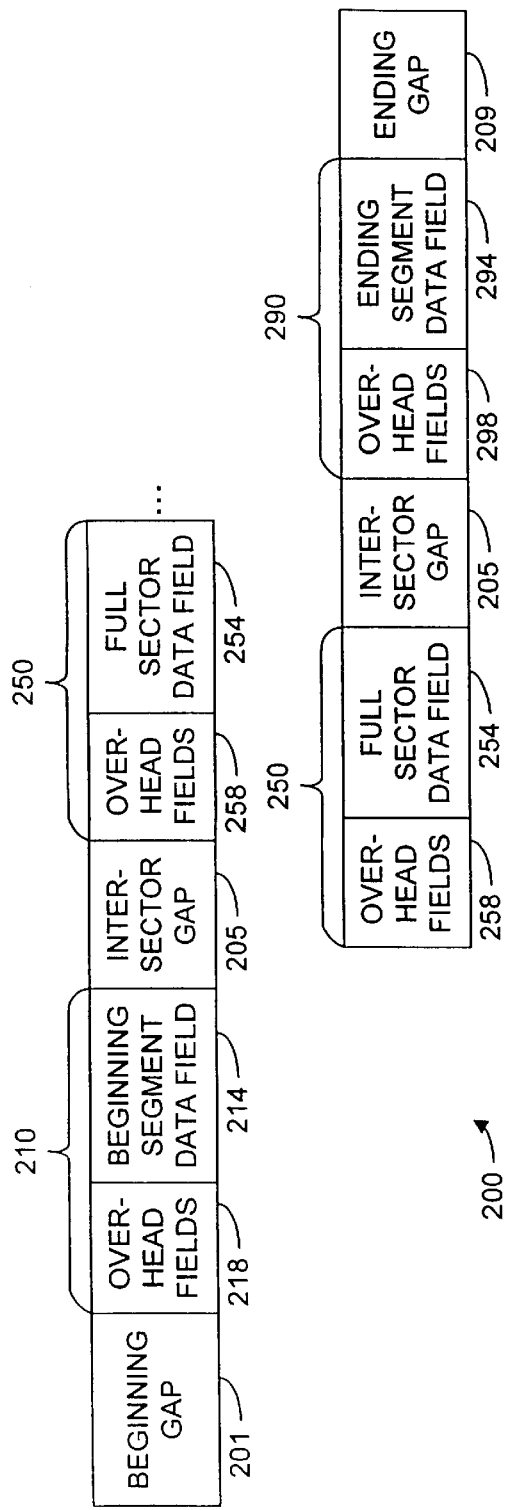
FIGS. 2A and 2B illustrate formats for a data frame and a data segment within a data frame.

In an exemplary embodiment of the invention, the frame parameters describe a data frame 200 illustrated in FIG. 2A. Data frame 200 contains one or more data segments where each data segment 210, 220, or 290 includes a data field 214, 224, or 294 and overhead fields 218, 228, or 298. At the beginning and end of data frame 200 are a beginning gap 201 and an ending gap 209. Between data sectors are inter-sector gaps 205 that provide a margin to avoid overwriting the beginning of one data segment on the end of another.

Data frame 200 includes, at least, beginning gap 201 following a servo sector, beginning data segment 210, and ending gap 209 preceding the next servo sector. Beginning data segment 210 can either be a full data sector or a partial data sector. Additional data segments such as data segment 290 or 220 are present if data frame 200 contains two or more data segments. For two or more data segments, data frame 200 includes beginning sector 210 and ending segment 290, either of which can be a full data sector or a partial data sector. For more than two data segments, data frame 200 further contains one or more copies of data segment 250 between beginning data segment 210 and ending data segment 290. Each segment 250 is a full data sector in the exemplary format.

Figure 2B:
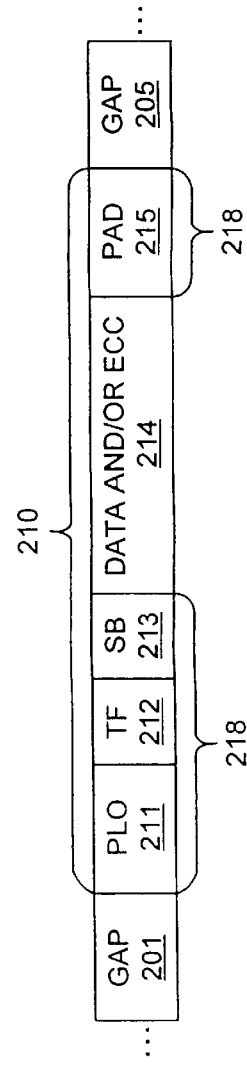

FIG. 2B illustrates a possible format for data segment 210 and surrounding gaps 201, 205, or 209. Beginning gap 201 covers disk area that is unusable because of variations in the time required to generate, detect, and act upon EOS pulses. A number of byte clock cycles is assigned to gap 201 to ensure that writing of a data segment does not begin until after the data heads have passed a servo sector. A possibly different number of byte clock cycles is assigned to gap 201 for reading to ensure that a read head has reached the first of the overhead fields. Overhead fields 218 include a phase lock (PLO) field 211, a training field 212, a byte synchronization field 213, and a pad field 215. As shown, overhead fields 218 can precede or follow data field 214. A hard drive manufacturer typically fixes the sizes of the overhead fields for all data segments in a track or across the entire drive.

PLO field 211 is for matching the frequency of signal BYTECLK to the byte rate during a read. When one of data heads 154 reads PLO field 211, a phase-locked loop in encode/decode circuit 158 locks the frequency of clock signal BYTECLK to the frequency of a pulse train in signal NRZ generated from PLO field 211. Sync byte field 213 is for byte alignment of data field 214. Typically, bytes in PLO field 211 have value zero, and sync byte field 213 contains one or more non-zero bytes. Some sync detection circuits require training field 212 between PLO field 211 and sync byte field 213; but in embodiments not having such sync detection circuits, training field 212 can be omitted. Similarly, pad bytes 215 provide a cushion of unused disk area that can be omitted.

Data field 214 contains storage locations for data and/or error correction code (ECC) bytes. The size of data field 214 depends on whether data segment 210 is a full data sector or a partial data sector. A data segment that is a full data sector has the maximum size data field and accommodates all of the data and ECC bytes in a data sector. A data segment that is a partial data sector contains a smaller data field because the data and ECC bytes for a data sector is partitioned between two partial data sectors.

In an exemplary track format, PLO field 211 is 12 bytes written with a constant value (zero). Training field 212 is an unambiguous 8-byte pattern that when read and decoded prepares sync detection circuits for decoding a 3-byte sync field 213. Data field 214 has a maximum size BPS of 548 bytes which include 512 data bytes and a 36-byte ECC. Pad field 215 has a size equal to 10 bytes. Start-up of disk system 100 initializes disk sequencer 140 with values for counts PLOCNT, TFCNT, SBCNT, BPS, and PADCNT indicating the respective lengths of PLO field 211, training field 212, sync bytes 213, a data field 254 for a full sector, and pad field 215. A count OVH is a total byte count for the overhead fields in each segment and in the exemplary embodiment, is the sum of counts PLOCNT, TFCNT, SBCNT, and PADCNT.

The beginning gap 201, inter-sector gap 205, and ending gap 209 provide tolerances for fluctuation in timing of EOS pulses and therefore may depend on a constant system clock frequency that is fixed rather than a byte clock frequency that varies by zone on the disk. In one embodiment of the invention, byte counts BGS, MGS, and EGS for respective gaps 201, 205, and 209 vary according the zone in which data heads 154 are positioned and are written to disk sequencer 140 during a seek to a new zone. Alternatively, byte counts BGS, MGS, and EGS can be large enough for any track and written to disk sequencer 140 during initialization.

Assuming the byte counts are known from counts BGS, PLOCNT, TFCNT, SBCNT, BPS, PADCNT, and MGS, the format of data frame 200 can be described using frame parameters B, NS, and E. Parameter B is a byte count for the data field of a beginning partial data sector, parameter NS is the number of full data sectors in the frame, and parameter E is a byte count for the data field of an ending partial data sector. If beginning data segment 210 is a full data sector, byte count B is zero. Ending byte count E is zero unless the data frame contains an ending segment 290 and ending segment 290 is a partial data sector. For the exemplary embodiment, a track format is restricted so that the first data frame (frame 1) starts with a full data sector. Accordingly, the only frame parameter required for frame 1are a count NS1 of the full data sectors in frame 1and a count E1 of the bytes in the data field of the ending partial data sector of frame 1.

Equation 1 indicates how a total byte count DFC for frame 1 can be determined from NS1, E1, and the fixed counts for the track.

$$DFC = BGS + NS1*(OVH+BPS+MGS) + (OVH+E1) + EGS \quad \text{Equation 1:}$$

The four terms summed on the right hand side of Equation 1 indicated byte counts for beginning gap 201, beginning segment 210 and segments 250 with following inter-sector gaps 205, ending segment 290, and ending gap 209, respectively.

The second data frame (frame 2) can be described by frame parameters B2, NS2, and E2 which respectively indicated the byte count for the data field of a beginning partial data sector in frame 2, the number of full data sectors in frame 2, and the byte count for the data field of an ending partial data sector of frame 2. Equation 2 gives the total byte count DFC for frame 2.

$$\begin{aligned}DFC &= BGS + (OVH+B2) + NS2* \\ &\quad (OVH+BPS+MGS) + \\ &\quad (OVH+E2) + EGS \\ &= BGS + (OVH+[BPS-E1]) + NS2* \\ &\quad (OVH+BPS+MGS) + \\ &\quad (OVH+E2) + EGS\end{aligned} \quad \text{Equation 2:}$$

Counts B2, NS2, and E2 for data frame 2 can be determined from counts NS1 and E1 for data frame 1. In particular, count E1 is the byte count for the data field of an ending partial data sector of frame 1 so that the beginning partial data sector of frame 2 contains the remainder of the data sector begun in frame 1. Accordingly, count B2 is equal to the byte count BPS for a full data sector minus count E2 for the ending partial data sector in frame 1.

E2 can be determined using the fact that frame 1 and frame 2 have the same total byte count DFC. Combining Equations 1 and 2 gives Equations 3 and 4.

$$E2 = 2*E1 + (NS1-NS2-1)*(OVH+BPS+MGS) \quad \text{Equation 3:}$$

$$E2 = (2*E1) \text{ modulo } (OVH+BPS+MGS) \quad \text{Equation 4:}$$

Equation 4 applies only if count E2 is positive. Solutions for count E2 in Equation 3 depend on counts NS1 and NS2 which in turn depend on the total byte count DFC for each data frame. In some cases, the solution for count E2 in Equation 3 is zero or negative and indicates that frame 2 has insufficient room after the last full data sector for a partial data segment containing a non-empty data field. In this case, count E2 is set to zero indicating frame 2 does not contain an ending partial data sector, and the following frame starts with a full data sector and therefore has the same format as frame 1.

If it can be shown that if a repeat value X that is the smallest integer that satisfies Equation 5, below, is less than a maximum frame number MAXFRAME for a track, frame X does not have an ending partial data sector, and frame X+1 has the same format as frame 1.

$$(X*E1) \text{ modulo } (OVH+BPS+MGS) \geq BPS \quad \text{Equation 5:}$$

More generally, the formats of data frames following data frame X+1 are the same as the formats for the frames following data frame 1. Thus, the format of track j is the same as the format for track (j modulo X).

It can further be shown that the byte count Ej, for the data field of a ending partial data sector in frame j is zero if (j modulo X) is zero, and that count Ej is given by Equation 6, $$Ej = ((j \text{ modulo } X)*E1) \text{ modulo } (OVH+BPS+MGS) \quad \text{Equation 6:}$$

if (j modulo X) is not zero. Byte count Bj for a beginning partial data sector in frame j is full sector byte count BPS minus the byte count E(j−1) for the ending partial data sector of the preceding frame if byte count E(j−1) is not zero. Accordingly, if ((j−1) modulo X) is not zero, beginning count Bj is given by Equation 7.

$$Bj = BPS - (((j-1) \text{ modulo } X)*E1) \text{ modulo } (OVH+BPS+MGS))$$

The number NSj of full data sectors in frame j is given by Equation 8, $$NSj = NS1 \quad \text{if } \{Bj = 0 \text{ or } Ej = 0 \text{ or}$$
$$(OVH + Bj + MGS + Ej) \leq E1\}$$
$$= (NS1 - 1) \quad \text{otherwise}$$

Equation 8:

In the exemplary embodiment of the invention, counts Bj, NSj, and Ej are frame parameters that format calculator 142 calculates while servo sequencer 130 processes a servo sector j. At an EOS pulse, disk control logic 144 begins using the frame parameters to identify beginnings and splits for data sector in data frame j. Disk control logic 144 can employ a known design.

Figure 3:
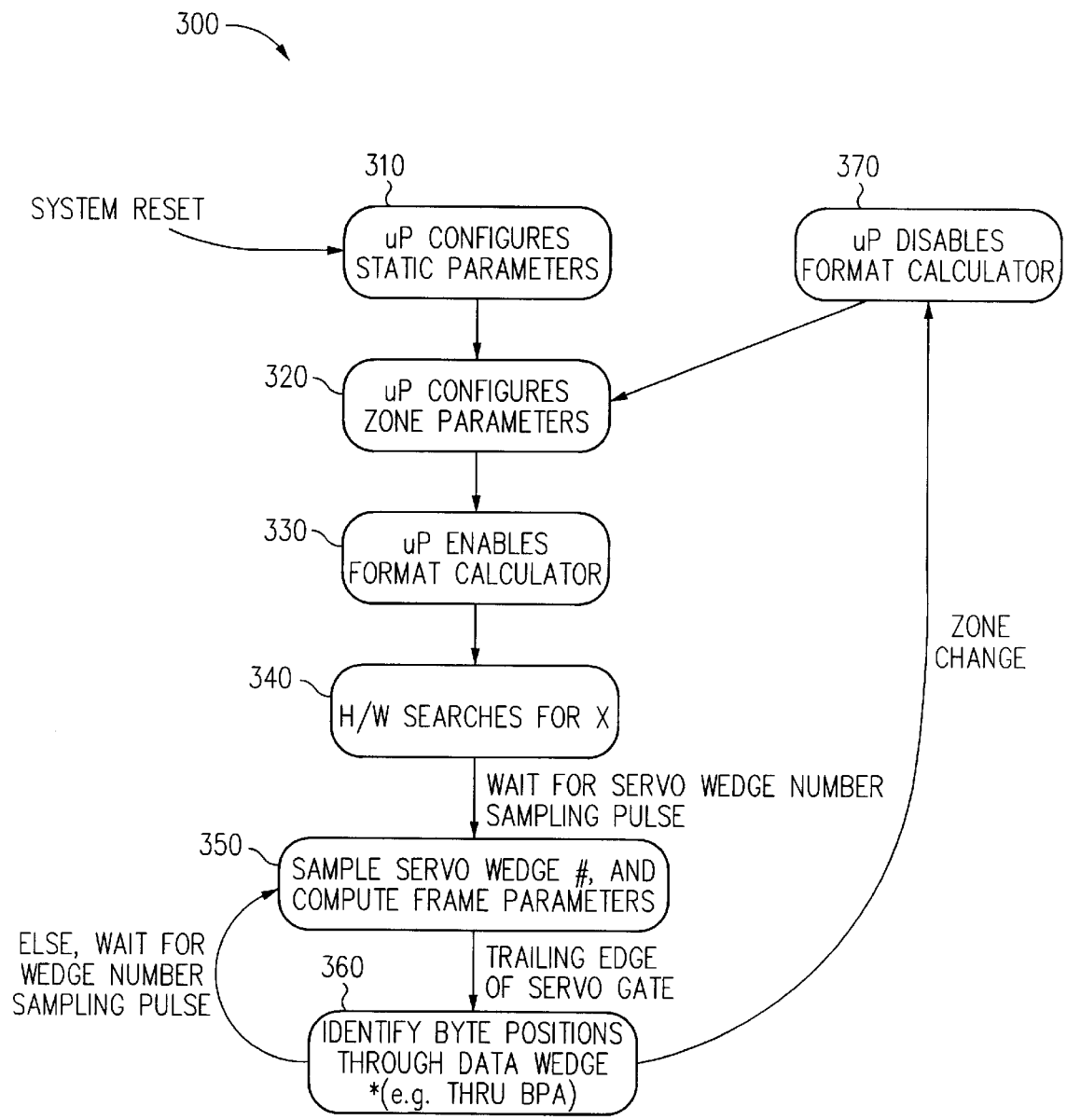
FIG. 3 is a flow diagram of a process for operating the hard disk of FIG. 1.

FIG. 3 illustrates a process 300 executed by headerless disk system 100. Initially, upon system start up or reset, microprocessor 110 writes static parameters including maximum frame number MAXFRAME and counts PLOCNT, TFCNT, SBCNT, BPS, and PADCNT to configuration registers in disk sequencer 140. The static parameters are valid for all tracks on disks 152 and are written during an initialization step 310. Static parameters PLOCNT, TFCNT, SBCNT, BPS, and PADCNT indicate the respective sizes of phase lock fields, training fields, sync bytes fields, data fields for full data sectors, and pad fields. In the exemplary embodiment, counts BGS and MGS vary from zone to zone and therefore are not static parameters. Alternatively, counts BGS and MGS may be static parameters.

Once disk system 100 is initialized, microprocessor 110, in step 320, identifies a target zone containing a data sector to be accessed and a transfers zone parameters for that zone to disk sequencer 140. Alternatively, zone parameters can be stored in data buffer 120 or non-volatile memory and retrieved directly from memory by disk sequencer 140. In the exemplary embodiment, the zone parameters include a 5-bit byte count BGS [4:0] indicating the size of beginning gap 201; a 5-bit byte count MGS [4:0] indicating the size of the inter-sector (or middle) gap 205; a 5-bit sector count NS1 [4:0] indicating the number of full data sectors in the first data frame; and a 10-bit byte count E1[9:0] indicating the number of bytes in the data field of an ending partial data sector of the first data frame. The zone parameters can be stored in data buffer 120 during initialization step 310 or can be stored in a non-volatile memory. Because only two words of zone parameters are required per zone, the memory capacity required is considerably less than that required to store track format tables in known headerless disk drive systems. Additionally, only a small amount of data bandwidth is needed to transfer zone parameters to disk sequencer 140, and the bandwidth for transfer of zone parameters is used during a seek not when data is being transferred to or from a disks 152.

Figure 4:
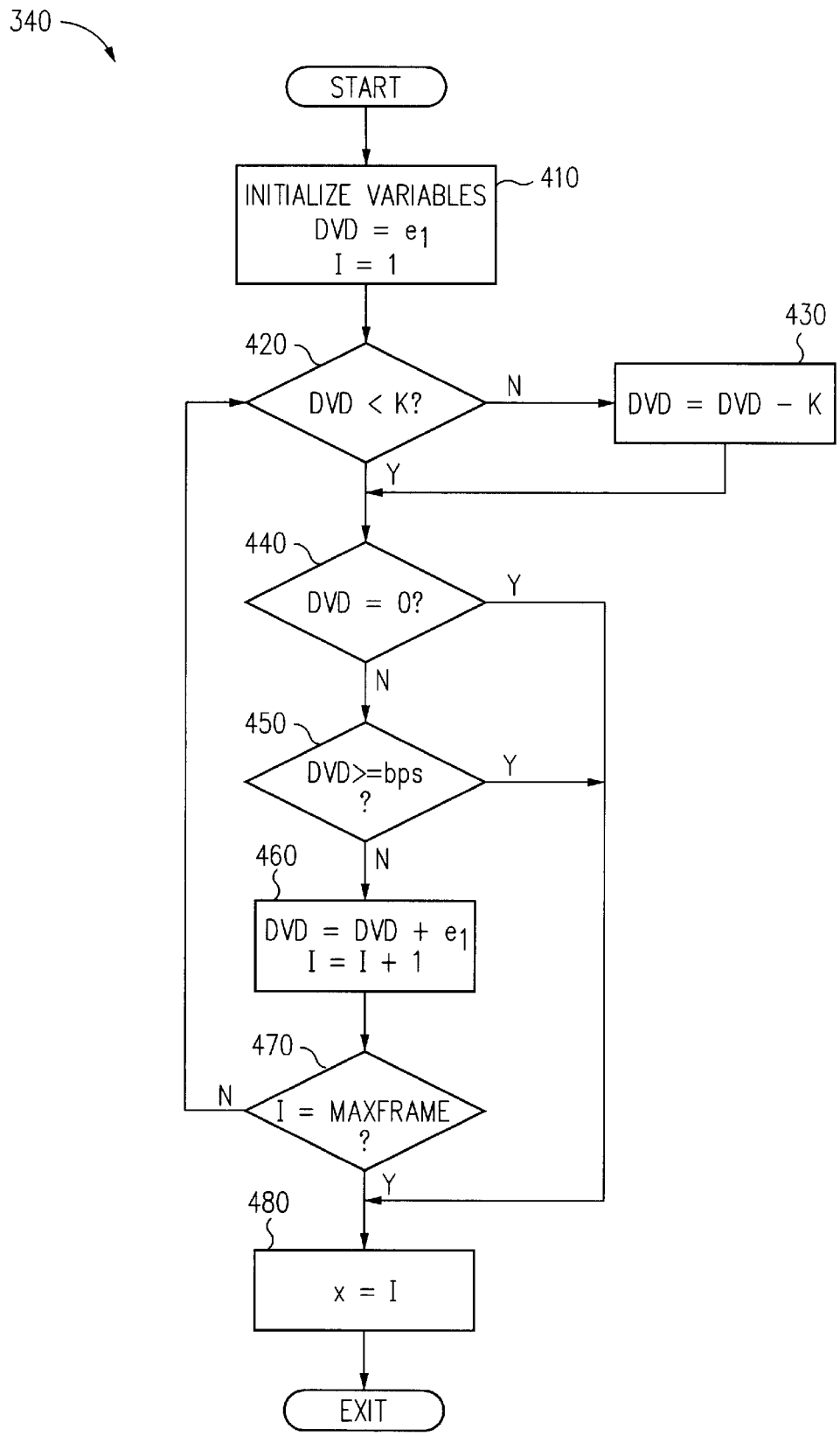
FIG. 4 is a flow diagram of a search for a repeat value for a track format.

After transferring the zone parameters, microprocessor 110 enables format calculator 142 in step 330, and format calculator 142 begins a search 340 for a repeat value X that satisfies Equation 5 and is less than or equal to maximum frame number MAXFRAME. FIG. 4 illustrates an exemplary search 340. The maximum time required to find a repeat value X using search 340 of FIG. 4 is proportional to the number of data frames in a track. For a track having about 30 data frames, for example, the maximum search time is about 31 system clock cycles and is orders of magnitude smaller than the average seek time to a new zone. Thus, the repeat value X is found before the seek operation is complete.

In an initial step 410 of search 340, an index I is set to 1, and a register value DVD is set to E1. Index I corresponds to a frame number, and value DVD corresponds to byte count Ei for the ending partial data sector in frame I. A step 420 determines whether value DVD is greater than a register value K which is the sum of counts OVH, BPS, and MGS. If variable DVD is greater than value K, value DVD is decrease by K in step 430 so that value DVD is a multiple of E1, modulo K. Steps 440 and 450 then determine whether value DVD is greater than or equal to count BPS or equal to zero. If so, the ending data segment in data frame I is a full data sector, and the repeat value has been found. Format calculator 142 then branches from step 440 or 450 to step 480, and repeat value X is equal to index I.

If in steps 440 and 450, value DVD is greater than zero and less than count BPS, search 340 transfers to step 460 to increment index I and increase DVD by byte count E1. Step 470 then compares index I to maximum frame number MAXFRAME. If index I is not equal to maximum frame number MAXFRAME, process 420 loops back to step 420 to determine if the frame corresponding to index I has an ending partial data sector. If index I is equal to maximum frame number MAXFRAME, repeat value X is set equal to maximum frame number MAXFRAME even though the actual repeat value may be greater than the number of frames on the track. The maximum frame number controls the maximum number of times format calculator 142 repeats a loop including steps 420, 430, 440, 450, 460, and 470, and therefore controls the maximum time required for search 340. In the exemplary embodiment, format calculator 142 completes the loop including steps 420, 430, 440, 450, 460, and 470 in one clock cycle.

Once repeat value X is known, format calculator 142 waits for a sampling pulse in a signal SAMPLE from servo sequencer. A signal FRAME# for servo sequencer then indicates a frame number j that format calculator 142 uses in a step 350 to determines frame parameters Ej, Bj, and NSj, according to Equations 6, 7, and 8.

Figure 5A:
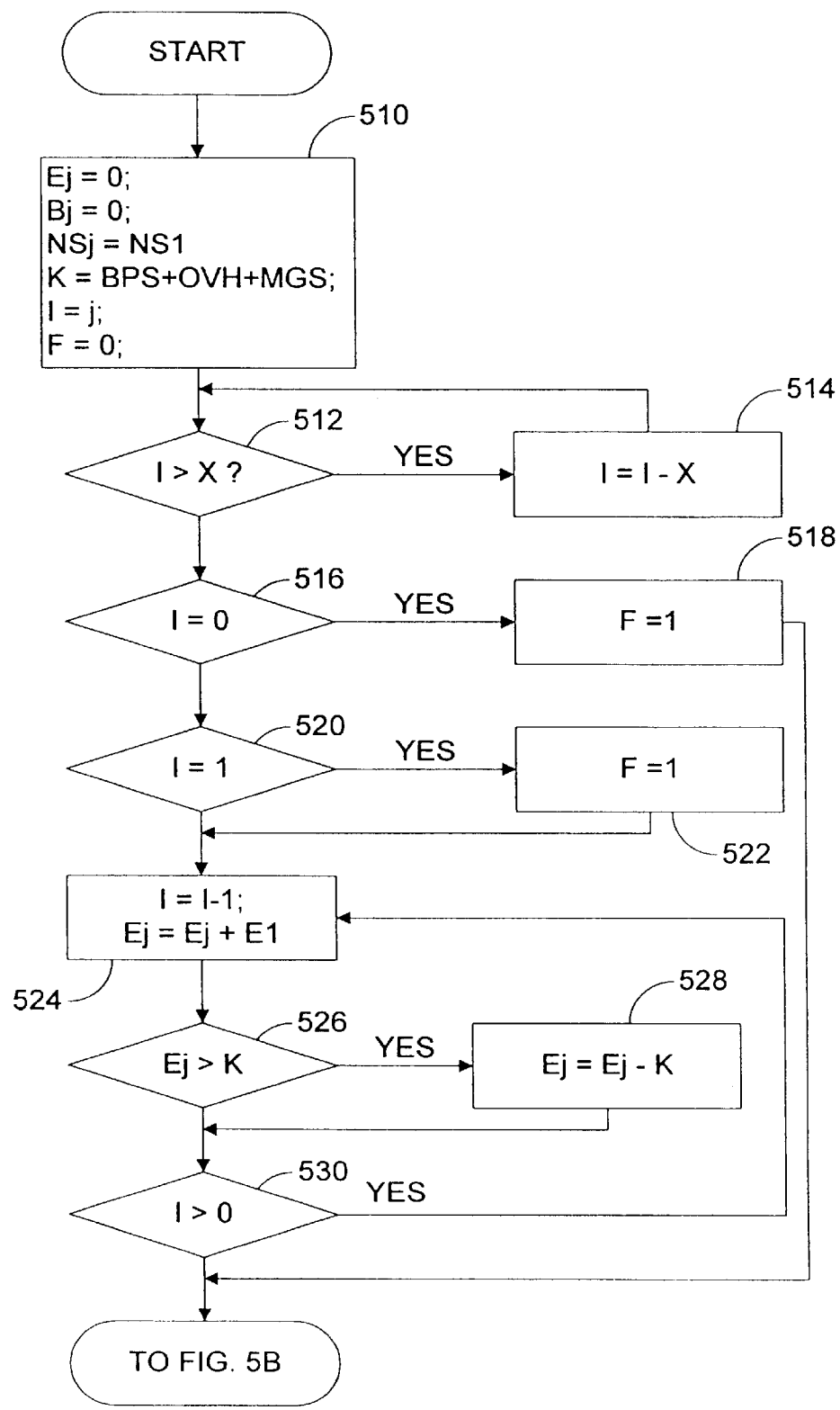
FIGS. 5A and 5B show a flow diagram of a process that determines frame parameters.
Figure 5B:
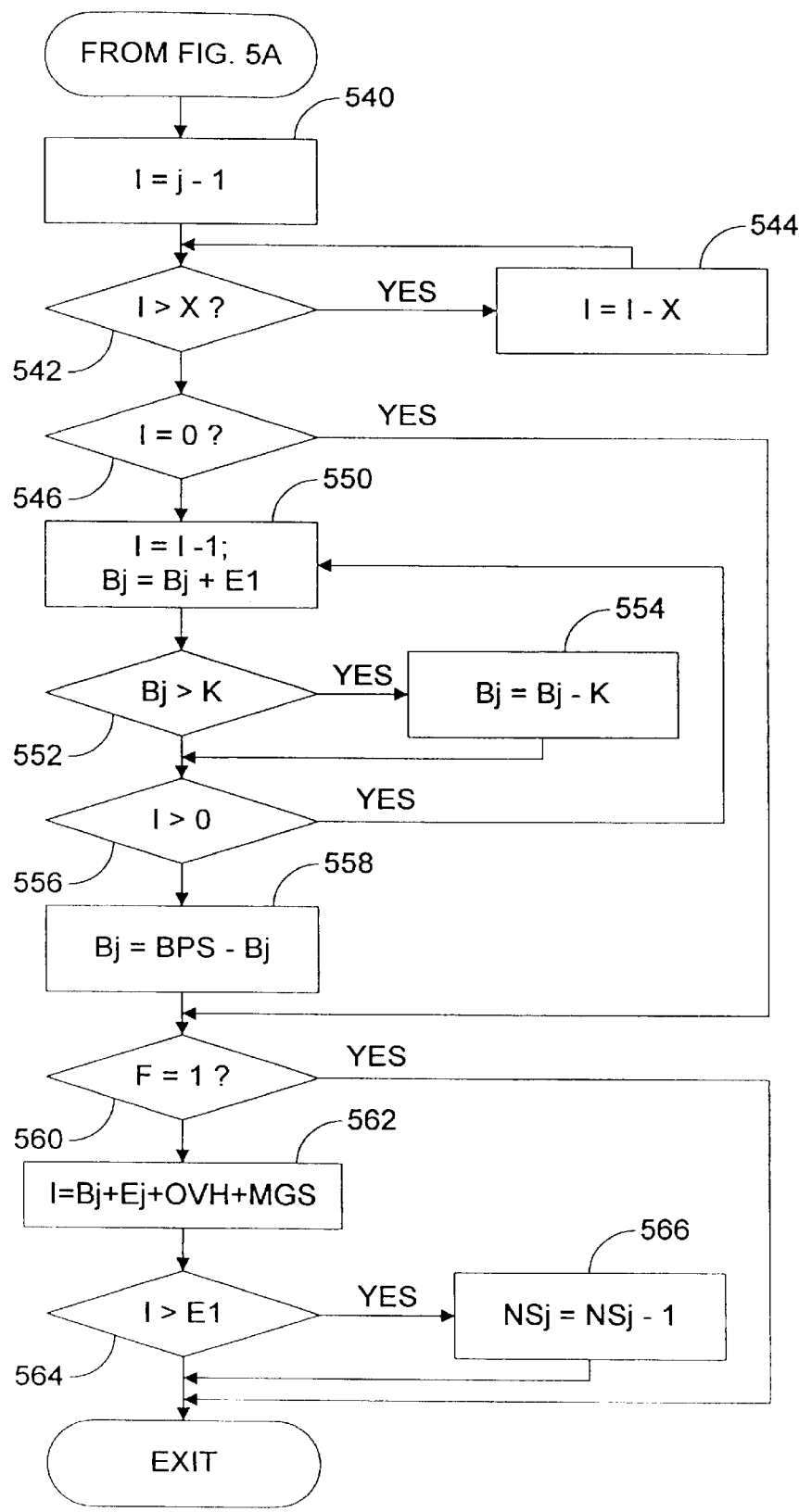

FIGS. 5A and 5B illustrate a process for determining the frame parameters. FIG. 5A shows the steps required to determine count Ej. In step 510, register values Ej, Bj, NSj, K, I, and F are initialized. Register values Ej, Bj, and NSj will be the calculated frame parameters. Value K is sum of counts BPS, OVH, and MGS that was calculated in search 340. Index I is initially set equal to the frame number j. Flag F is initially cleared, but is set if j modulo X is zero or one. A loop including steps 512 and 514 compares index I to repeat value X and decreases value I by X if value I is greater than repeat value X. Steps 512 and 514 are repeated until I is less than or equal to X (i.e. is equal to j modulo X).

If in step 516, I is equal to 0, j modulo X is equal to zero, and format calculator 142 transfers to step 518 and sets flag F to 1. Count Ej is zero, its initial value, so that format calculator 152 transfers step 518 to process 550 illustrated in FIG. 5B. If I is equal to 1, format calculator 142 transfers through step 516 and step 520 to step 522. Step 522 also sets flag F to 1, but from there, format calculator 142 transfers to step 524. If index I is neither zero nor one in steps 516 and 520, format calculator 142 passes directly to step 524.

Steps 524, 526, 528, and 530 form a loop that calculates the value of Ej, ((j modulo X)*E1) modulo K. For each pass through the loop, step 524 decrements index I and adds count E1 to register value Ej. The loop is repeated I times so that repeated addition results adds a total of I*E1 to Ej. Steps 526 and 528 subtract K from value Ej if value Ej is greater than K. The results is a value modulo K. Accordingly, after step 530, register value Ej correctly indicates the byte count for the ending partial data sector.

FIG. 5B shows the steps required to complete calculations of counts Bj and NSj. In step 540, Index I is reset to j−1. A loop including steps 542 and 544 subtracts repeat value X from index I if I is greater than X and repeats if necessary until I is less than or equal to X. Index I is then equal to (j−1) modulo X. If index I is equal to zero, byte count Bj is zero, and format calculator 142 branches from step 546 to step 560.

If index I is not equal to zero, a loop including steps 550, 552, 554, and 556 calculates the byte count E(j−1) for the ending partial data sector of the preceding data frame and temporarily stores the result in register value Bj. In the loop, step 550, decrements index I and increases value Bj by count E1. Steps 552 and 554 convert value Bj to a value modulo K, and step 556 causes the loop to repeat I times so to calculate ((j−1) modulo X) modulo K. Step 558 sets register value Bj to the correct value for the byte count of the beginning partial data sector of frame j.

Steps 560, 562, 564, and 566 correct value NSj. If j modulo X is 0 or 1 as indicated by flag F being 1, value NSj keeps the initialized value NS1 from step 510, and format calculator 142 branches from step 560 and exits the frame parameter calculation process. Otherwise, step 562 determines the sum of counts Bj, Ej, OVH, and MGS, and steps 564 and 566 set NSj to NS1−1 if the sum is greater than value E1. Following step 560, 564, or 566, frame parameters Ej, Bj, and NSj have the correct values for frame j and the frame parameter calculation is complete.

Format calculator 142 completes the calculation of the frame parameters before servo sequencer 130 finishes processing the servo sector. The processes of FIGS. 5A and 5B use repeated iterations for modulo calculations. For faster calculation, a divider can be used in calculation of E(j−1), and parameters Ej and Bj can be derived from E(j−1) using an adder, subtractor, and comparator. Format calculator 142 passes the frame parameters to disk control logic 144, and in a step 360, disk control logic 144 identifies data sector starts and splits in frame J using the frame parameters Ej, Bj, and NSj.

When the frame number of the next servo sector is available, disk system 100 returns to step 350 (FIG. 3) where format calculator 142 calculates frame parameters for the next data frame. The frame number used in the calculation can either be from servo sequencer 130 or maintained by format calculator 142. No latency is introduced by format calculator 142 because format searches and calculations are completed during a seek or servo sector processing. If a seek occurs that requires a zone change, disk system 100 transitions to step 370 where microprocessor 110 disables format calculator 142 before configuring format calculator 142 with new zone parameters in step 320. Processing of data frames in the new zone proceeds as described above.

Figure 6:
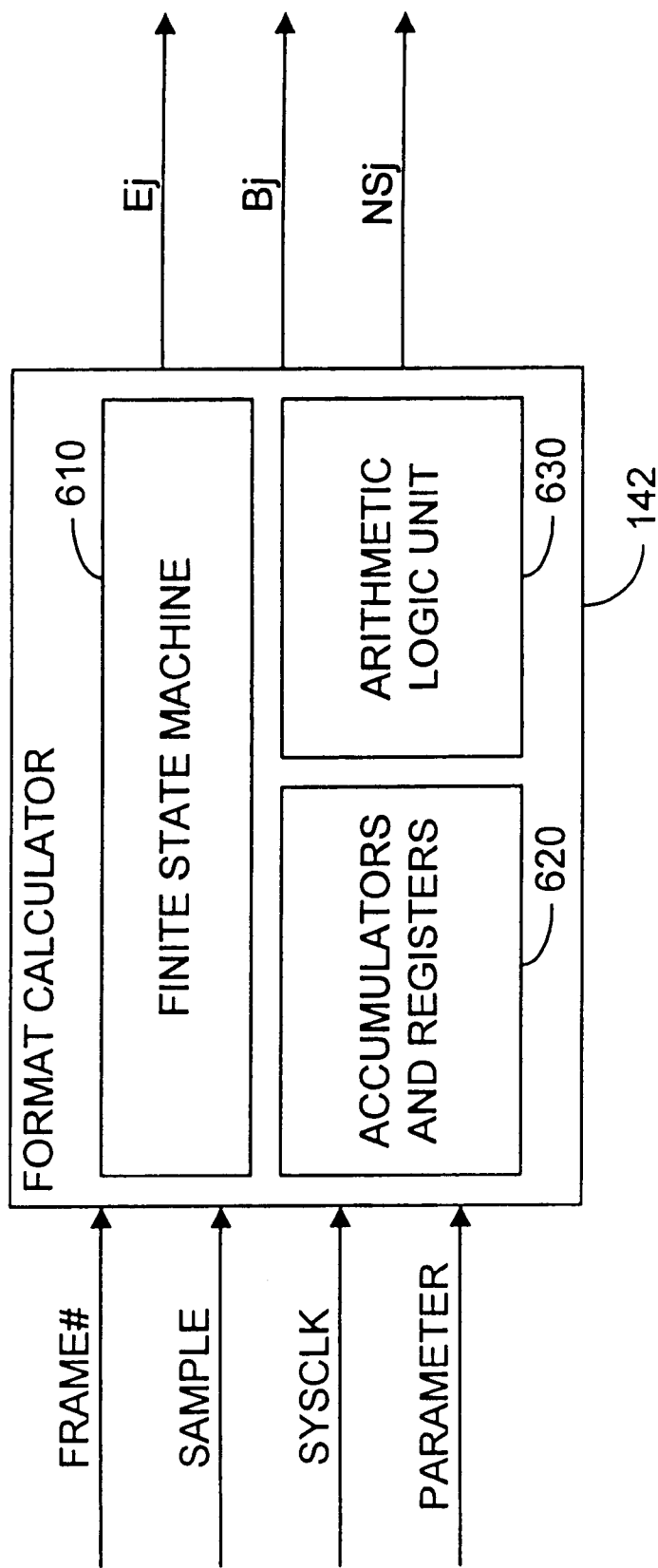
FIG. 6 is a block diagram of a format calculator for a disk controller in accordance with an embodiment of the invention.

FIG. 6 shows a block diagram of an embodiment of format calculator 142. Format calculator 142 includes registers and accumulators 620 for static parameters, a frame number, zone parameters, frame parameters, and variables used in the repeat value search and calculation of the frame parameters. An arithmetic logic unit 630 under the control of a state machine 610 preforms the arithmetic operations required for the repeat value search and the frame parameter calculations. Arithmetic logic unit 630 includes adders and comparators as required for the processes steps of FIGS. 4, 5A, and 5B. Alternatively, a multiplier and divider may be employed to eliminate repeated additions and subtractions used in processes 5A, and 5B when calculating a value modulo X or K. State machine 610, which controls the processes of FIGS. 4, 5A, and 5B, may be implemented using well known design processes for finite state machines.

Figure 7:
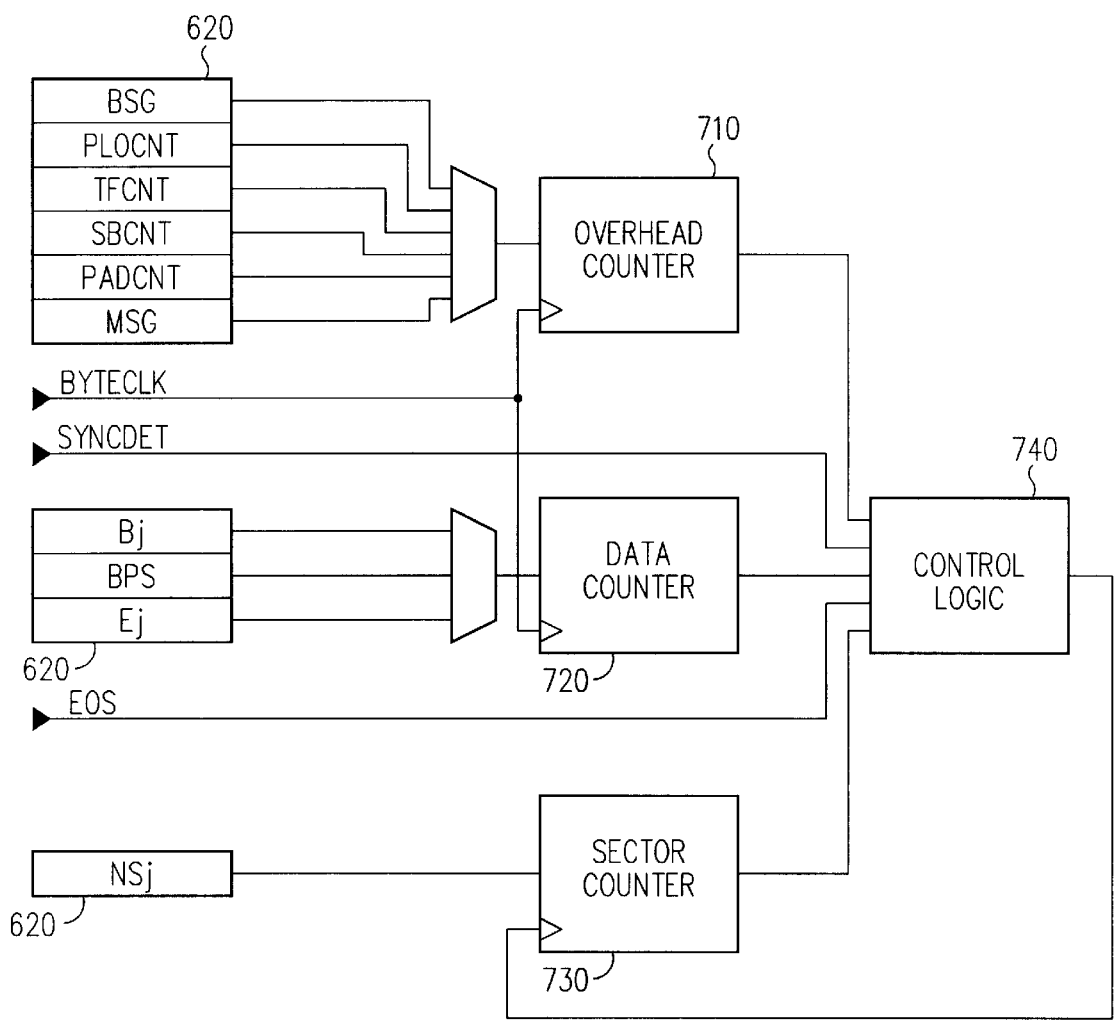
FIG. 7 is a block diagram of a disk control circuit for a disk controller in accordance with an embodiment of the invention.

FIG. 7 is a block diagram of an embodiment of disk control logic 144. Disk control logic 144 initially loads count NSj for data frame j in a sector counter 730, loads a byte count BGS for beginning gap 201 in an overhead counter 710. A data counter 720 is initially loaded with a beginning partial data sector count Bj if count Bj is non-zero or loaded with full sector count BPS if count Bj is zero and count NSj is non-zero. If counts Bj and NSj are zero, data counter 720 is loaded with ending partial data sector count Ej. Each time data counter 720 is loaded with count BPS, sector counter 730 decrements.

In response to an EOS pulse, overhead counter 710 begins decrementing count BGS for beginning gap 201. When overhead counter 710 decrements count BGS to zero, control logic 740 starts processing the beginning data segment 210. For a data segment, overhead counter 710 is loaded with counts PLOCNT, TFCNT, and SBCNT for overhead fields 211, 212, and 213 at the beginning of data segment 210. Data counter 720 starts in response to signal SYNC-DET and decrements once for each cycle of clock signal BYTECLK. While data counter 720 is decrementing, data may be transferred if data field 214 is part of a requested data sector. Overhead counter 710 is loaded with a count PADCNT for pad field 215; and when data counter 720 reaches zero marking the end of data field 214, overhead counter 710 is restarted.

Further processing of the data frame depends on the number of data segments in the data frame. If both counts NSj and Ej are zero, the data frame has no more data segments, and disk control logic 144 waits for new frame parameters and the next EOS pulse. If count NSj or Ej is non-zero, overhead counter 710 is loaded with byte count MGS indicating the size of gap 205. The end of gap 205 marks the start of the next data segment. That data segment is processed in the same manner as data segment 210. If sector counter 730 has not decremented to zero, count BPS is loaded into data counter 720, sector counter 730 decrements, and control logic 740 processes another data segment in the manner described above for beginning data segment 210. If the count in sector counter 730 is zero but count Ej is non-zero, count Ej is loaded into data counter 720 before control logic 740 handles the last data segment of the frame.

In an alternative embodiment of the invention, microprocessor 110 provides the repeat value X to disk sequencer 140 as a zone parameter. The repeat value X may be stored with zone parameters E1 and NS1 in data buffer 120 or non-volatile memory, or microprocessor 110 can perform a search such as illustrated in FIG. 4 during a seek to determine repeat value X. Format calculator 142 still calculates the frame parameters during servo sector processing, but is simplified by elimination of logic associated with the search for repeat value X.

In another alternative embodiment of the invention, microprocessor 110 (FIG. 1), during processing of each servo sector, performs frame parameter calculations such as illustrated in FIGS. 5A and 5B and passes frame parameters to the disk sequencer 140. Microprocessor 110 may also search for repeat value X or retrieve repeat value X with other zone information. This alternative embodiment has the disadvantage of increasing the burden on microprocessor 110 and on the available bandwidth for data transfers. However, the alternative embodiment still requires less storage capacity for format information than do disk systems that describe the track formats using a look-table per zone. Additionally, format calculator 142 may be eliminated which simplifies disk sequencer 140.

In yet another alternative embodiment of the invention, format calculator 142 is integrated as part of a servo sequencer 130 integrated circuit. In this embodiment, servo processing includes operation of format calculator 142 on the frame number determined from the servo sector and passing of calculated frame parameters to disk sequencer 140.

Although the invention has been described with reference to particular embodiments, the description is only an example of the invention's application and should not be taken as a limitation. Various adaptations and combinations of features of the embodiments disclosed are within the scope of the invention as defined by the following claims.

What is claim is:

1. A method for operating a headerless disk drive system, comprising:

performing a seek that positions a data head in an operable relation to a track containing a data sector to be accessed;

processing parameters that indicate a format for a first data frame and a frame number j that identifies a second data frame to generate frame parameters for the second data frame; and identifying boundaries of data segments in the second data frame using the frame parameters generated for the second frame.

2. The method of claim 1, further comprising processing a servo sector adjacent the second data frame to determine the frame number j of the second data frame.

3. The method of claim 2, wherein processing the parameters and the frame number j is completed before processing of the servo sector is completed.

4. The method of claim 1, wherein a disk sequencer performs the processing to generate the frame parameters and identifies the boundaries of data sectors.

5. The method of claim 4, further comprising:

transferring a first set of parameters to the disk sequencer during initialization of the disk drive system; and transferring a second set of parameters to a disk sequencer when performing the seek, wherein the disk sequencer processes the first and second sets of parameters to generate the frame parameters for the second data frame.

6. The method of claim 1, further comprising determining a value X such that a third data frame having a frame number that differs from a frame number of the first data frame by the value X has a format that is the same as that of the first data frame, wherein processing parameters includes processing value X.

7. The method of claim 1, wherein processing to generate the frame parameters comprises performing an arithmetic operation on the frame number j.

8. The method of claim 7, further comprising determining a value X such that a third data frame having a frame number that differs from a frame number of the first data frame by the value X has a format that is the same as that of the first data frame, wherein the value X is an argument of the arithmetic operation.

9. The method of claim 8, wherein the parameters indicating the format of the first data frame comprise:

a parameter E1 indicating a byte count for an ending partial data sector in the first data frame; and data sectors in the first data frame.

10. The method of claim 9, wherein the parameters processed further comprise:

a parameter BPS indicating byte count for a data field of a full data sector;

parameters indicating byte counts for overhead fields in each data segment, wherein a value OVH is a total of the parameters indicating byte counts for overhead fields; and a parameter MGS indicating a size of an inter-sector gap.

11. The method of claim 10, wherein performing the arithmetic operation comprises determining a byte count Ej for an ending partial data sector of the second data frame, wherein Ej is equal to ((j modulo X)*E1) modulo (OVH+BPS+MGS) if (j modulo X) is not zero and is equal to zero otherwise.

12. The method of claim 10, wherein performing the arithmetic operation comprises determining a byte count Bj for a beginning partial data sector of the second data frame, wherein Bj is equal to { BPS−(((j−1) modulo X)*E1) modulo (OVH+BPS+MGS))} if ((j−1) modulo X) is not zero and is equal to zero otherwise.

13. The method of claim 12, wherein performing the arithmetic operation further comprises determining a byte count Ej for an ending partial data sector of the second data frame, wherein Ej is equal to ((j modulo X)*E1) modulo (OVH+BPS+MGS) if (j modulo X) is not zero and is equal to zero otherwise.

14. The method of claim 13, wherein performing the arithmetic operation comprises determining a number NSj of full data sectors in the second data frame, wherein NSj is equal to NS1-1 if (Bj+Ej+OVH+MSG) is greater than E1 and ((j modulo X) is not 0 or 1, and is equal to NS1 otherwise.

* * * * *